Figure 4:
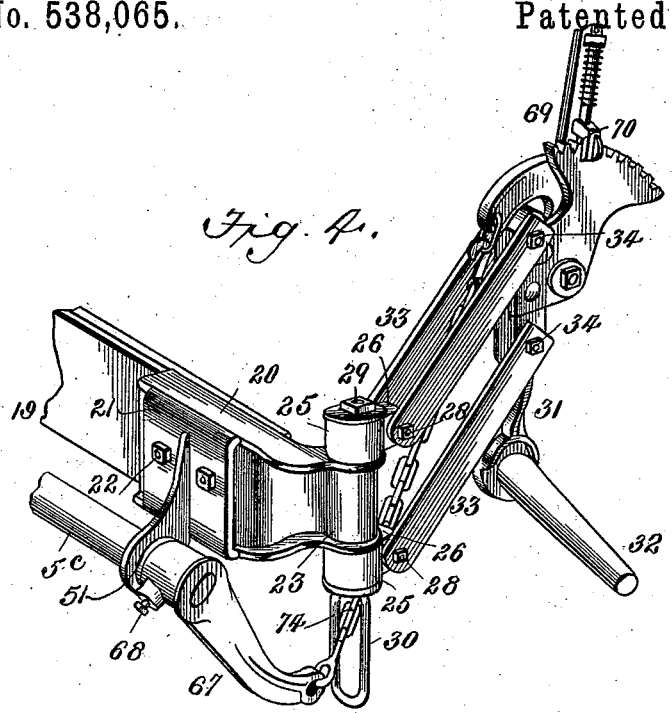

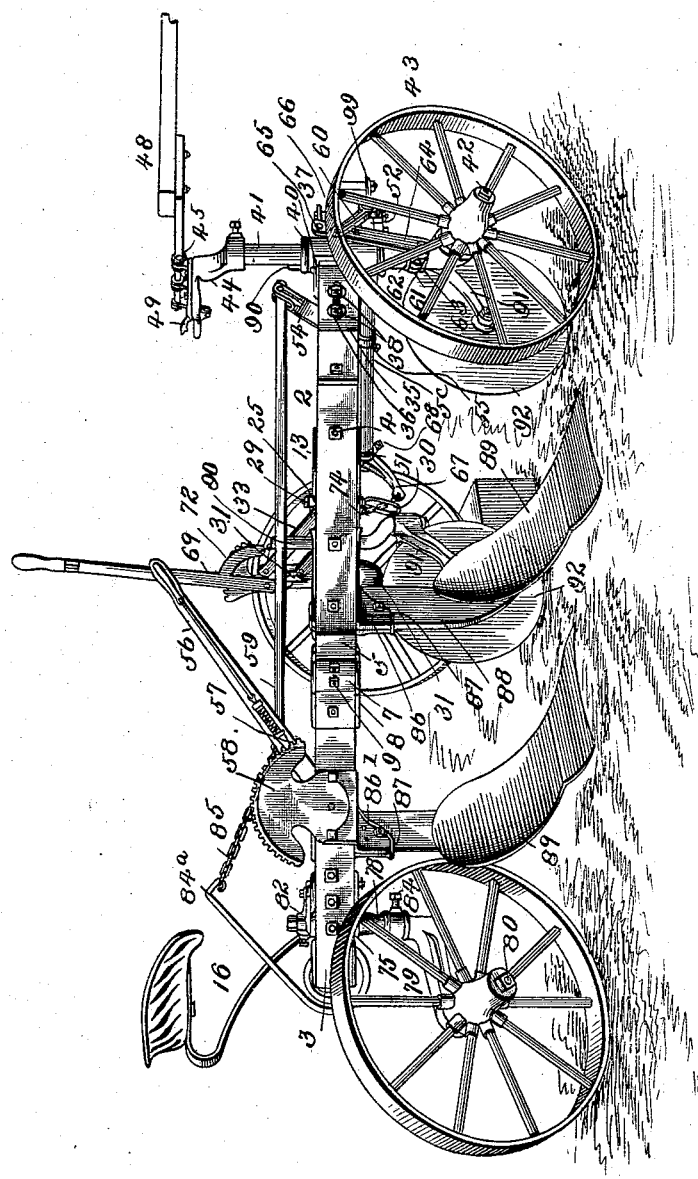

(No Model.)  
5 Sheets—Sheet 2.
W. L. CASADAY.
GANG PLOW.
No. 538,065.  
Patented Apr. 23, 1895.
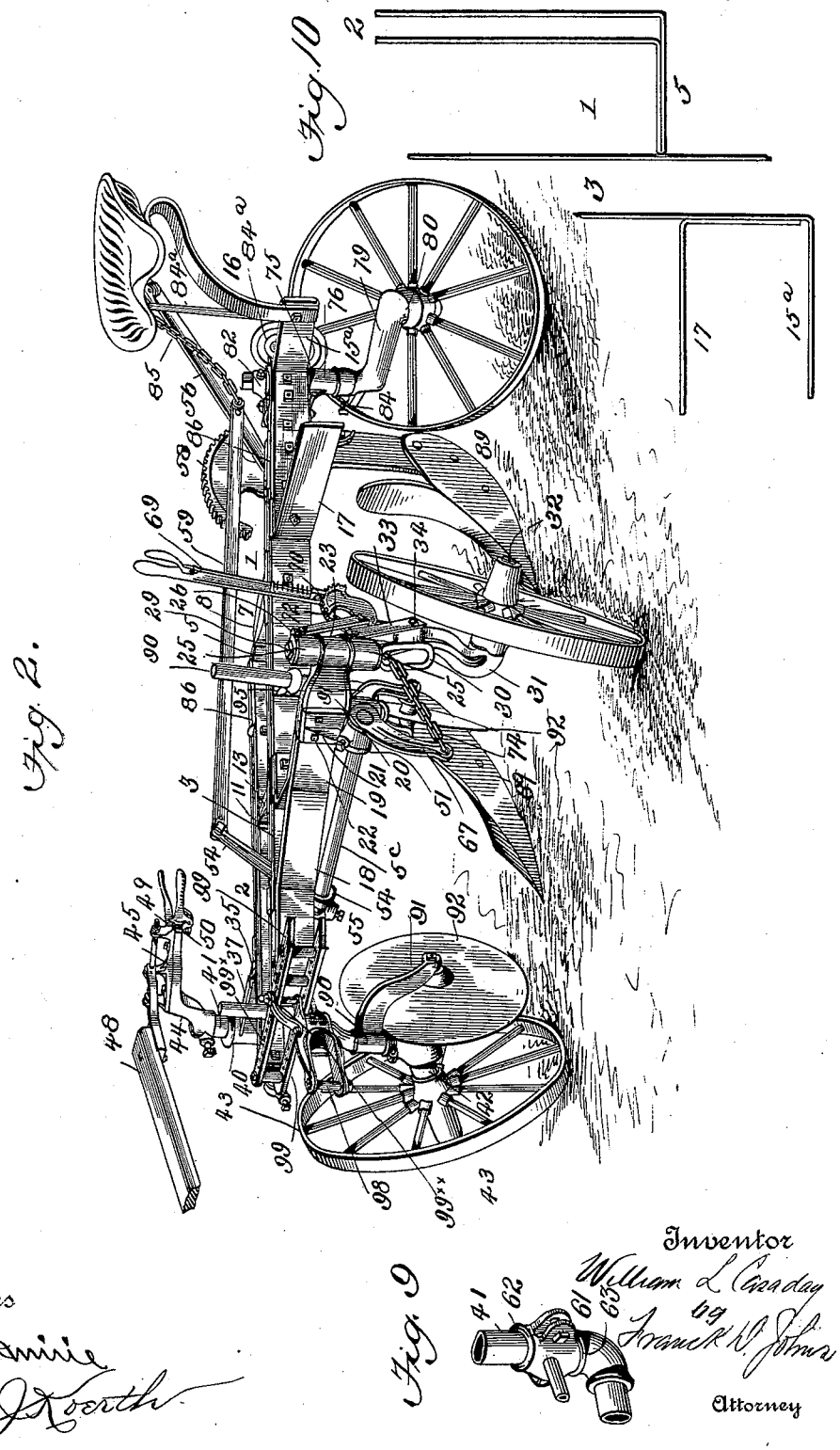
Witnesses  
Inventor  
William L Casaday  
by Franck W. Johns  
Attorney (No Model.) 5 Sheets—Sheet 3.
W. L. CASADAY.
GANG PLOW.
No. 538,065. Patented Apr. 23, 1895.
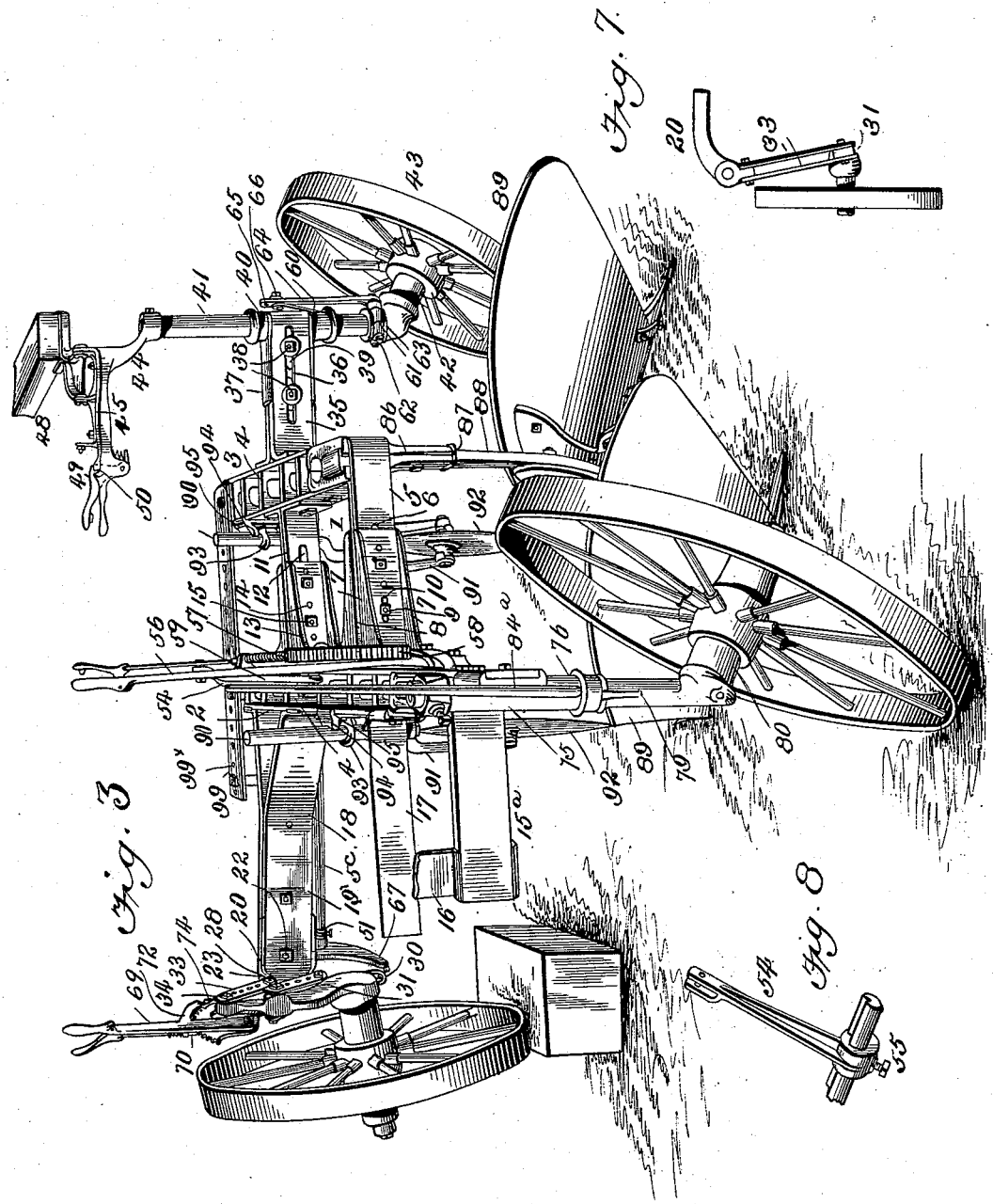
Witnesses
Inventor
William L Casaday
by
Franck W. Johns
Attorney (No Model.) 5 Sheets—Sheet 4.

W. L. CASADAY.
GANG PLOW.

No. 538,065. Patented Apr. 23, 1895.

Witnesses

Inventor
William L. Casaday
by
Franck D. Johns
Attorney

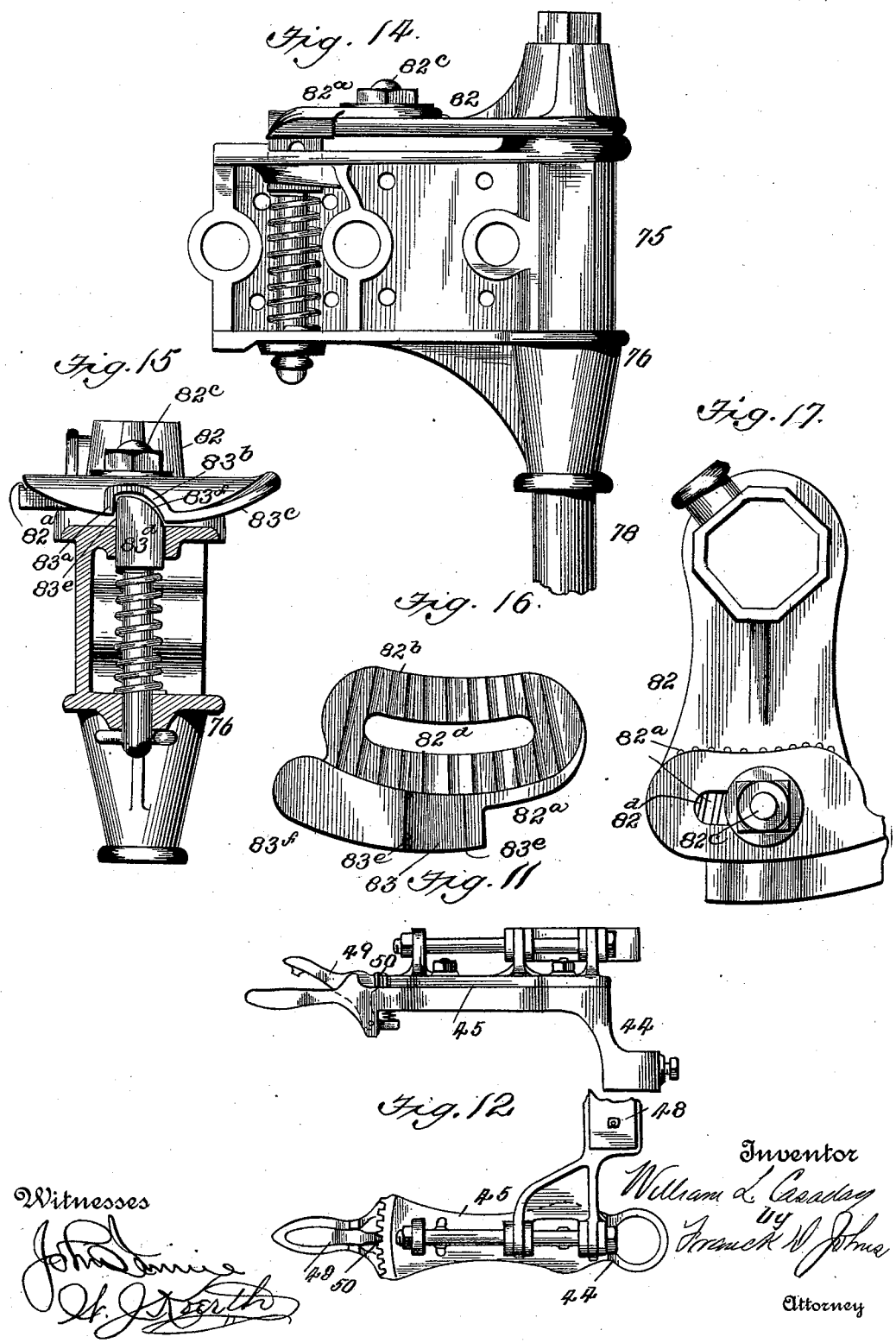

UNITED STATES PATENT OFFICE.

WILLIAM L. CASADAY, OF SOUTH BEND, INDIANA.

GANG-PLOW.

SPECIFICATION forming part of Letters Patent No. 538,065, dated April 23, 1895.

Application filed December 28, 1894. Serial No. 533,149. (No model.)

*To all whom it may concern:*

Be it known that I, WILLIAM L. CASADAY, a citizen of the United States, residing at South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

My invention relates to certain improvements in gang or sulky plows and more particularly to that class of said plows in which three wheels are employed, one of said wheels being generally known as the land-wheel.

It has been discovered from practical use that in order to get a light draft from a plow of this description, that there must be no side draft and that the wheels should not run out of line. Heretofore in plows using a land-wheel it has been difficult to keep said land-wheel in line with the draft and furrow wheels and to prevent side draft.

The objects of my invention are to overcome these objections. This I accomplish by providing a plow of the class described with a castered land-wheel which will at all times and under all conditions run in line with the furrow wheels and track toward the center.

A further object of my invention is to form the plows of the gang without landsides and to construct and arrange the furrow wheels so that they will take the place of the landsides of the plows and will have absolute control over said plows and form accurate gages that insure perfectly straight furrows of uniform width and depth; further, to provide means by which the front furrow wheel can be controlled by the operator independent of the movement of the team, no matter which way they may crowd; further, to provide means whereby the depth of plowing may be predetermined and fixed before going on the field and into operation, and still further to provide a gang plow with a single operating and lifting lever for placing the plow in or out of an operative position.

With these several objects in view my said invention consists in certain novelty in the construction, arrangement and combination of the various parts of the plow, all of which I will now proceed to point out and describe.

Reference is had to the accompanying drawings, in which—

Figure 5:
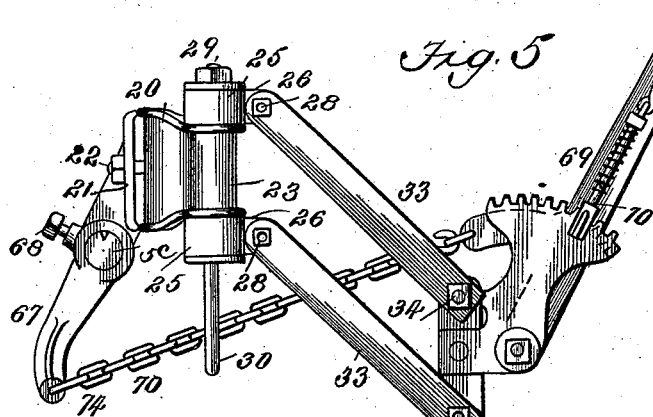
Figure 6:
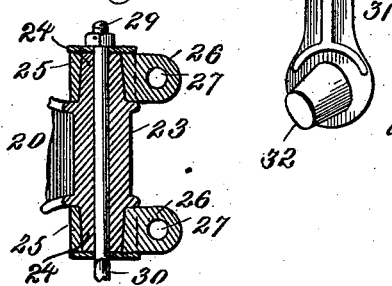

Figure 1 is a perspective of a plow embodying my invention, taken from the furrow side and showing the same in an operative position; Fig. 2, a perspective taken from the landside, showing the plow out of operation and turning to the left; Fig. 3, a perspective taken from the rear; Fig. 4, an enlarged perspective of the mechanism for operating the land-wheel and front furrow wheel. Figs. 5, 6, and 7 are further details of the land wheel and furrow wheel operating mechanism. Figs. 8 and 9 are details of parts of the furrow wheel mechanism, and Figs. 10, 11, 12, 13, 14, 15, 16 and 17 are further details of various parts of my said invention.

Referring to said drawings, the numeral 1 indicates the main frame of the machine which is rectangular in form and consists of two pairs of parallel flat metal bars 2 and 3, the bars of each pair being also parallel and united by suitable bolts and braces 4, the landside pair of bars 3 being longer than the furrow side bars 2 and extend back of said furrow bars; said landside and furrow bars for the beams to which the plow standards are secured as hereinafter described. The rear ends of the furrow side bars are bent in at right angles and form the rear of the main frame.

6 is a longitudinal slot in the ends 5.

7 are parallel metal bars or castings secured to the landside bars 3 by suitable bolts. Said bars are provided with upper and lower flanges 8 and are set sufficiently far apart to form a seat in which the ends 5 are held and are secured by bolts 9 passing through suitable bolt holes 10 and the longitudinal slot 6. A series of the bolt holes 10 is provided.

11 is a similar bar or arm secured to the forward portion of the landside of the bar 2, at right angles to said bar and parallel with the end 5. Said bar or arm is also provided with a longitudinal slot 12. 13 are bars or castings similar in construction to the bars 9, forming a seat for the bars 11 and provided with a series of bolt holes 14 and bolts 15.

By this construction the landside and furrow side of the main frame may be adjusted to or from each other.

15ª is an arm or bracket formed by bending the rear end of one of the pair of landside bars out at right angles to the frame. On said arm is secured the seat standard and seat 16.

17 is a foot rest secured to the frame in front of the seat.

18 is a Y-shaped bracket attached to the landside of the frame near its forward end and forms what may be termed the land-frame, the straight arm 19 of the Y-shaped frame projecting at right angles to the main frame.

20 is a casting saddled on the front of the outer end of the arm 19, and 21 is a casting secured to the front of said casting 20. Said castings are secured to the arm by bolts 22. The casting 20 is provided with a rearwardly and outwardly extending arm 23. On the upper and lower sides of the end of said arm are formed vertical trunnion bearings 24, on which are loosely mounted collars 25 provided with projecting lugs 26 having horizontal bearings 27, in which are secured bolts 28. The collars are held in place by a bolt 29 having on its lower end or head an elongated eye or yoke 30.

31 is a vertical arm or casting forming the land-wheel axle and having on its lower end a downwardly and forwardly inclined spindle 32, on which the land-wheel is mounted. Said wheel inclines out from the top of the frame.

33 are parallel upper and lower links of equal length, pivoted at one end to the bolts 28 and at their other ends to the arm or axle of the land-wheel, by bolts 34. Said links have their pivotal points equal distances apart, permitting the land wheel to be raised or lowered and at the same time maintain the arm or axle in a perpendicular position, whereby the incline of the land-wheel is the same at all times, no matter what position the plow may assume. The collars mounted on the trunnion bearings permit the wheel to be turned to the right or left, thus forming a caster wheel of said land-wheel. It will thus be seen that the land-wheel has a substantially universal joint connection with the frame.

The construction above described enables the land wheel to readily fall in line with the draft and track after the furrow wheels under all conditions.

When in operation a plow provided with a castered land-wheel such as described is entirely free from side draft and a light and even draft for the plow is effected, and accurate and straight furrows are assured. The above construction also enables the plow to be readily and easily turned either to the right or left.

To the forward portion of the furrow side of the frame is bolted an arm 35 extending at right angles to the frame and provided with a longitudinal slot 36. 37 is a casting saddled on said arm 35 and adjustably secured thereto by bolts 38 passing through the longitudinal slot 36 and bolt holes 39.

40 is a vertical sleeve bearing formed in the outer end of said casting in which is loosely mounted a vertical shaft or axle 41 of the forward furrow wheel, having formed integral therewith a downwardly inclined spindle 42 on which is mounted forward inclined furrow wheel 43. The shaft 41 it will be seen can be raised or lowered as required.

44 is a lever keyed to the top of the vertical shaft or axle 41, by means of which the front furrow wheel is controlled.

45 is a casting pivoted to the top of the lever 44 and capable of a limited horizontal movement to the right or left.

48 is the pole or tongue pivotally secured to the casting 45 and capable of a vertical movement, thus preventing the direction of the plows from being interfered with should the team crowd in either direction.

49 is a spring locking dog which engages a stop 50 in the casting 45 and when so engaged holds the pole or tongue and prevents it from turning on its pivot, thus securing the pole to the upper end of the vertical furrow wheel axle. This lever and its connecting parts enable the operator to have complete and absolute control of the furrow wheel, so that the same can be kept against the wall of the furrow and direct the plows, thus insuring straight and even furrows.

51 is a horizontal bearing formed on the front of the casting 21 and 52 is a similar horizontal bearing formed on the casting 37 in a line with the bearing 51. 5ᶜ is a horizontal rock shaft mounted in said bearings and arranged at right angles to the side bars of the frame.

54 is a lever arm keyed on the shaft 5ᶜ and held in place by a set screw 55.

56 is an operating lever pivoted to the frame in convenient reach of the operator and is provided with a spring controlled dog 57 engaging a toothed sector 58 also attached to the frame.

59 is a link connecting the operating lever and lever arm of the rock shaft, said link being pivoted at one end to the operating lever and at its other end to the lever arm of the rock shaft.

60 is a short upwardly extending rock arm keyed on the furrow end of the rock shaft.

61 is a two part collar or box mounted on the vertical furrow shaft or axle between flanges 62 and 63.

64 is a link pivoted at one end to the collar or box and at the other end to the short rock arm.

65 are a series of holes in the end of the link by means of which its length may be regulated, the bolt 66 being placed in the proper hole. This construction enables the front furrow wheel to be raised or lowered with relation to the frame as the rock shaft is rocked, and is held in the adjusted position by the spring locking dog of the operating lever, the vertical furrow wheel shaft or axle being however free to turn at all times to the right or left.

67 is a downwardly extending and outwardly curved rock arm keyed to the landside end of the rock shaft and secured thereto by a set screw 68. Said rock arm projects from and is arranged upon the rock shaft substantially at right angles to the line of projection of the rock arm 60.

69 is a lever pivoted to the upper end of the vertical arm or land-wheel axle 31, and is provided with a spring controlled locking dog 70, which engages a toothed sector bolted to said arm or axle.

72 is a short curved arm formed on and projecting from the lever 69.

74 is a chain or other suitable connection attached at one end to the end of the rock arm 67 and at its other end to the arm 72, thus connecting the rock shaft and upper end of the vertical arm or axle of the land-wheel. Said shaft passes through the yoke or eye on the end of the bolt below the trunnion bearings and its line of draft is diagonally across the rectangular space formed between the parallel links.

It will readily be seen that by moving the lever back or forward the length of the chain or other connection between the rock arm and upper end of the vertical arm or axle of the furrow wheel is in effect shortened or lengthened, and regulates or limits the vertical movement of the parallel links at the same time limiting the height that the land wheel can be raised with relation to the level of the frame and plow bottoms, and determining the depth of the furrow. The dog of the locking lever being adjusted in the proper notch of the sector holds the connection as adjusted and causes the plow to turn the furrow at the predetermined depth as more fully hereinafter described.

75 is a casting secured between the rear ends of the landside bars of the frame. In said casting is formed a vertical sleeve bearing 76, in which is journaled a crank axle consisting of an upper straight member 78 journaled in the bearing, a rearwardly and downwardly inclined member 79 and a downwardly inclined member 80 forming the spindle of the rear caster furrow wheel 81, said parts being so arranged that the rear caster furrow wheel will set at an incline to the wall of the furrow.

To the upper end of the member 78 of the crank axle is secured an arm 82 having on its outer end a serrated or toothed segmental face 82$^a$. To said arm is adjustably secured a catch 82$^b$ having a segmental serrated under face adapted to engage the serrations of the face 82$^a$ and held thereon by a bolt and nut 82$^c$ passing through a segmental slot 82$^d$. The catch is provided with a locking notch or recess 83 having one wall 83$^a$ perpendicular and the opposite wall 83$^b$ beveled and provided with a beveled portion 83$^c$ extending therefrom. 83$^d$ is a spring dog mounted in the casting 75 and having a perpendicular face 83$^e$ and a beveled face 83$^f$. The catch and spring dog arranged as above described hold the rear furrow wheel and cause it to run in line with the frame and at the same time permit it to automatically lock and unlock when turning to the left, but are so arranged that said furrow wheel will not turn when the plow is turned to the right, but will form a pivot for said plow.

83 is a collar secured on the vertical member of the crank axle just below the vertical bearing, by means of a set screw 84, by means of which the rear end of the frame can be raised or lowered and thus control the suction of the plow.

To the straight bar of the pair of landside bars of the frame is secured a counter balance spring 84$^a$ which is connected to the operating and lifting lever by a chain 85. This spring aids in lifting the frame and plows thus greatly reducing the power required to be exerted to raise said plows and frame.

86 are substantially angular castings secured between the rear portion of the bars forming the landside and furrow side of the frame or beams of the plow. Said castings are provided with seats 87 in which are rigidly secured the vertical standards 88 of the plows. Said standards are arranged at right angles to the level of the frame. 89 are the plows bolted to said standards. Said plows are provided with mold boards, wings and points, but do not have a landside, the furrow wheels acting as landsides for the plows thus enabling the furrow wheels to have entire control of the plows at all times. The plow bottoms are arranged at right angles to the standards and parallel with the horizontal level of the frame. 90 are the colter shafts or standards carrying on their lower ends yokes 91 in which are mounted the colters 92. Said colter shafts are secured to the furrow and landside bars or beams of the plow by eye bolts 93, the shafts resting against seats 94 in castings 95 saddled on and bolted to the frame.

99 are two flat horizontal bars secured to the front of the frame at right angles to the side bars. Said horizontal bars are provided with a series of upper and lower holes 99$^\times$, registering with each other, and form the clevis of the plow to which a coupling 98 is secured by a pin or bolt 99$^{\times\times}$. The coupling is preferably attached so that the draft will be in a line with the landside bar or beam of the plow. In using a team of four horses abreast the draft is perfect. One horse will be in the furrow and the other three upon the land. It will of course be understood that the coupling can be adjusted at any position on the clevis which may be found to give the best draft.

Before going into the field the width of the furrows is determined by adjusting the furrow and landside bars or beams of the plow and the forward furrow wheel the proper distance apart. To adjust the plow to turn a furrow of a predetermined depth, say for example six inches, let the plows down until the bottoms are on the floor and the frame level, then raise the land wheel and put a block six inches in height under said wheel and set the dog of the regulating lever in the proper notch of the toothed sector to hold the chain or connection between said lever and the rock arm of the rock shaft taut. This adjustment limits the upper movement of the parallel links and land wheel with relation to the frame and regulates the height said wheel can be raised when in operation. It is only necessary now to note the notch that the dog of the main operating and lifting lever rests in and when upon the field adjust said lever in the position noted. The land wheel will be raised to the predetermined height and the plow will turn a furrow six inches in depth until otherwise adjusted. If desired, for convenience, the notches on the toothed sector of the operating lever can be numbered or otherwise marked. When plowing in stubble ground the plows should be raised off the floor in making the adjustment, about one half an inch, but when the ground is solid on top the plow bottoms should rest on the floor as above described. As heretofore described the front furrow wheel and landside caster wheel are operated by one lever and the connections of the various parts with the said lever are so arranged that the landwheel travels up or down about twice as fast as the furrow wheel, and when the lever is operated, the counterbalance spring being properly set the front of the plow frame and the plows are easily lifted. In plowing the frame is always held level and hence furrows of a continuous even depth are turned. In opening the first furrow it is advisable to release the counter-balance spring, especially if deep plowing is desired.

By means of the lever connected to the front furrow wheel shaft and pole, said front furrow wheel can always be under the control of the operator no matter which way the team may crowd thus enabling said wheel to be set in line with the beams. The land-wheel being castered, all the objections to this class of plows are overcome, as said wheel is free to turn in any direction and run in the line of draft and track after the furrow wheels, insuring an even draft and in turning corners this caster wheel relieves all the strain from the plow and frame and insures a perfect corner. In turning to the left the rear wheel automatically unlocks and locks itself. In turning to the right the rear wheel does not unlock, but forms the pivot the plow turns on. In making the right turn the operating lever should be forced down before the furrow wheel runs up on the land. Three, four or more plows may be used in the gang with my improved plow, by simply adding the necessary parts to the frame.

Instead of the toothed sector and locking lever and dog, any other means may be employed to limit the movement of the parallel links and land-wheel arm or axle.

In Fig. 13 I have shown the chain provided on its upper end with a strap having a series of holes $b$. When the land-wheel is adjusted to the desired height the bolt or pin $c$ is put through the proper hole in the strap to hold the parts as adjusted.

It is obvious that various other changes may be made in the details of the construction of the several parts of my improved plow, without departing from the spirit and scope of my invention, and I do not wish to be understood as limiting myself to the specific construction herein shown and described.

Having thus fully described my invention, what I claim as new, and desire to secure by Letters Patent, is—

1. In a wheel or gang plow, the combination with a frame carrying the plows, of a caster land wheel secured to said frame, whereby said land wheel may be turned to the right or left, substantially as shown and described.

2. In a wheel or gang plow, the combination with a frame carrying the plows, of a caster land wheel secured to the frame and mechanism for raising and lowering said land wheel with relation to said frame, substantially as shown and described.

3. In a wheel or gang plow, the combination with a frame carrying the plows, of a caster land wheel secured to said frame, mechanism for raising and lowering said land wheel with relation to the frame, and mechanism for limiting the vertical movement of the land wheel, substantially as shown and described.

4. In a wheel or gang plow, the combination with a frame carrying the plows and provided with front and rear inclined furrow wheels, of an inclined castered land-wheel, the incline of the furrow wheels and land-wheel being in opposite directions, substantially as shown and described.

5. A wheel or gang plow provided with castered land and furrow wheels substantially as shown and described.

6. In a wheel or gang plow, the combination with a frame carrying the plows and provided with front and rear castered furrow wheels, of a land-wheel castered to said frame and mechanism for regulating and controlling the direction of travel of the forward furrow wheel, substantially as shown and described.

7. In a wheel or gang plow, the combination of a frame carrying the plows, with a front castered furrow wheel, mechanism for controlling the direction of travel of said wheel, a rear castered furrow wheel, means for limiting the movement of said wheel on its pivot, and a castered land-wheel, substantially as shown and described.

8. In a wheel or gang plow, the combination with a frame carrying the plows, of a vertical arm or axle carrying the land-wheel, two parallel links of equal length, horizontally and vertically pivoted at one end to the land-side of their frame and at their other ends horizontally pivoted to the land-wheel arm or axle, and having equal distances between their pivotal points, mechanism for raising and lowering the land-wheel arm or axle and means for limiting the vertical movement of said arm or axle and land-wheel with relation to the frame, whereby the depth of the furrow may be regulated and predetermined, substantially as shown and described.

9. In a wheel plow, the combination with the frame carrying the plows, a rock shaft mounted on said frame and provided with a rock arm and means for operating said rock shaft, of a vertical arm or axle carrying the land-wheel, two parallel links of equal length horizontally and vertically pivoted at one end to the landside of the frame and at their other ends horizontally pivoted to the land-wheel arm or axle and having equal distances between their horizontal pivotal points, and an adjustable connection between the upper end of said land-wheel arm or axle and rock shaft, all constructed arranged and operating substantially as shown and described.

10. In a wheel or gang plow, the combination with a frame carrying the plows, a rock shaft mounted on said frame and provided with a rock arm and means for operating said rock shaft, of a vertical arm or axle carrying the land-wheel, two parallel links of equal length horizontally and vertically pivoted at one end to the landside of the frame and at their other ends horizontally pivoted to the land-wheel arm or axle and having equal distances between their horizontal pivotal points, and an adjustable connection between the rock arm of the rock shaft and land-wheel arm or axle, whereby the vertical movement of the land-wheel with relation to the frame and plows may be regulated, substantially as shown and described.

11. In a wheel or gang plow, the combination with a frame carrying the plows, a rock shaft mounted on said frame and provided with a rock arm and means for operating said rock shaft, of a vertical arm or axle carrying the landwheel, two parallel links of equal length, horizontally and vertically pivoted at one end to the landside of the frame and at their other ends horizontally pivoted to the landwheel arm or axle and having equal distances between their horizontal pivotal points, a chain or other connection secured at one end to the rock arm of the rock shaft and adjustably secured at its other end to the landwheel arm or axle, all constructed, arranged and operating substantially as shown and described.

12. In a wheel or gang plow, the combination with a frame carrying the plows, a rock shaft mounted in said frame and provided with a rock arm, means for operating the rock shaft, vertical trunnion bearings formed on the landside of the frame, an eye or yoke located beneath said bearings and collars loosely mounted on said trunnion bearings, of a vertical arm or axle carrying an inclined land-wheel, two parallel links of equal length pivoted at one end to the collars and at their other ends to the land-wheel arm or axle and having equal distances between their pivotal points, a chain passing through the yoke or eye and secured at one end to the rock arm and adjustably secured at its other end to the upper end of the land-wheel arm or axle, all constructed, arranged and operating substantially as shown and described.

13. In a wheel or gang plow, the combination with a frame carrying the plows, a rock shaft mounted on said frame and provided with a rock arm, and means for operating the rock shaft, of a vertical arm or axle carrying the land-wheel, two parallel links of equal length horizontally and vertically pivoted at one end to the landside of the frame and horizontally pivoted at their other ends to the land-wheel arm or axle and having equal distances between their horizontal pivotal points, a toothed sector rigidly secured to the upper end of the land-wheel arm or axle, a lever pivoted to said arm or axle and provided with a locking dog engaging the toothed sector, and a chain or other connection secured at one end to the rock arm of the rock shaft, and having its other end adjustably secured to the lever, all constructed, arranged and operating substantially as shown and described.

14. In a wheel or gang plow, the combination with a frame carrying the plows, and having forward and rear furrow wheels and a castered land-wheel, or mechanism for raising and lowering the front furrow wheel and castered land-wheel with relation to the frame and a single operating lever connected with said mechanism, substantially as shown and described.

15. In a wheel or gang plow, the combination with a frame carrying the plows and provided with forward and rear furrow wheels and a castered land-wheel, of a rock shaft mounted on said frame, mechanism, controlled by the rock shaft, for raising and lowering said forward furrow wheel and land-wheel, and a single operating and lifting lever connected with the rock shaft, substantially as shown and described.

16. In a wheel or gang plow, the combination with a frame carrying the plows and provided with forward and rear furrow wheels and a castered land-wheel, a rock shaft mounted on said frame, a single operating lever connected with said rock shaft, mechanism for raising and lowering the forward furrow wheel and landside wheel with relation to the frame and means for limiting the vertical movement of the land-wheel, whereby the depth of the furrow may be predetermined and regulated, substantially as shown and described.

17. In a wheel or gang plow, the combination with a frame carrying the plows a vertical sleeve bearing formed on the forward furrow side of the frame, a rock shaft mounted on said frame and provided with a rock arm and means for operating said rock shaft, of a vertical furrow wheel shaft or axle loosely mounted in said bearing, and a link pivotally secured at one end to the rock shaft rock arm and at its other end adjustably pivoted to the furrow wheel shaft or axle, all constructed, arranged and operating substantially as shown and described.

18. In a wheel or gang plow, the combination with a frame carrying the plows a vertical sleeve bearing formed on the forward furrow side of the frame, a rock shaft mounted on said frame and provided with a rock arm and means for operating said rock shaft, of a vertical shaft or axle loosely mounted in the vertical bearing and provided with an inclined spindle carrying an inclined forward furrow wheel, a collar or box loosely mounted on the lower end of the vertical shaft or axle and an adjustable link pivoted at one end to the rock arm and at its other end to the said collar, and a lever controlling the rotation of the vertical shaft or axle and the direction of travel of the forward furrow wheel, substantially as shown and described.

19. In a wheel or gang plow, the combination with a frame carrying the plow standards and plows having a mold board and point of furrow wheels controlling the lateral movement of said plows and acting as landsides therefor, substantially as shown and described.

20. In a wheel or gang plow, the combination with a frame, plow standards secured to said frame and carrying plows provided with mold boards and points, of furrow wheels pivotally mounted on said frame and acting as landsides for and controlling the plows, substantially as shown and described.

21. In a wheel plow, the combination with a frame, plow standards secured to said frame and carrying plows provided with a mold board and point, of a castered land-wheel and pivoted furrow wheels, said furrow wheels acting as landsides for the plows and controlling said plows, substantially as shown and described.

22. In a wheel plow, a frame carrying plows having their landsides formed by pivoted furrow wheels, substantially as shown and described.

In testimony whereof I affix my signature in presence of two witnesses.

WILLIAM L. CASADAY.

Witnesses:
OWEN D. MYERS,
C. A. BUSSEY.